(12) United States Patent
Morii et al.

(10) Patent No.: US 11,996,578 B2
(45) Date of Patent: May 28, 2024

(54) VENT PLUG FOR LEAD-ACID BATTERY AND LEAD-ACID BATTERY

(71) Applicant: GS Yuasa International Ltd., Kyoto (JP)

(72) Inventors: Tatsuya Morii, Shizuoka (JP); Shinsuke Oki, Shizuoka (JP); Yu Kojima, Shizuoka (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 17/760,954

(22) PCT Filed: Sep. 7, 2020

(86) PCT No.: PCT/JP2020/033731
§ 371 (c)(1),
(2) Date: Mar. 16, 2022

(87) PCT Pub. No.: WO2021/054164
PCT Pub. Date: Mar. 25, 2021

(65) Prior Publication Data
US 2022/0336912 A1    Oct. 20, 2022

(30) Foreign Application Priority Data
Sep. 20, 2019 (JP) ................................ 2019-171065

(51) Int. Cl.
*H01M 50/308* (2021.01)
*H01M 10/06* (2006.01)

(52) U.S. Cl.
CPC .......... *H01M 50/308* (2021.01); *H01M 10/06* (2013.01)

(58) Field of Classification Search
CPC .. H01M 50/308; H01M 50/60; H01M 50/645; H01M 50/392; H01M 10/06
See application file for complete search history.

(56) References Cited

FOREIGN PATENT DOCUMENTS

| EP | 0193508 B1 * | 1/1989 |
|---|---|---|
| JP | S53104917 U | 8/1978 |
| JP | S5353052 Y2 | 12/1978 |
| JP | S5457430 U | 4/1979 |
| JP | S54176829 U | 12/1979 |
| JP | S55137465 U | 9/1980 |
| JP | S5773864 U | 5/1982 |
| JP | S5789271 U | 6/1982 |
| JP | S6230286 Y2 | 8/1987 |

(Continued)

OTHER PUBLICATIONS

English translation of Ono et al. (JP-6427707-B1). (Year: 2018).*

(Continued)

*Primary Examiner* — Haroon S. Sheikh
*Assistant Examiner* — Drew C Newman
(74) *Attorney, Agent, or Firm* — RANKIN, HILL & CLARK LLP (57) ABSTRACT

A vent plug (18) includes a head portion (35), a cylindrical portion (36), and a filter (34). The cylindrical portion (36) includes a cylinder portion (40), a screw thread portion (42), a slit (45), and a through hole (43). The filter (34) is disposed at a position where the through hole (43) is provided in a central axis (L) direction. The screw thread portion (42) intersects the slit (45) only at a first-peripheral screw thread portion.

6 Claims, 6 Drawing Sheets

(56) References Cited

FOREIGN PATENT DOCUMENTS

| | | |
|---|---|---|
| JP | H0466766 U | 6/1992 |
| JP | H04121660 U | 10/1992 |
| JP | H0548215 U | 6/1993 |
| JP | H1116559 A | 1/1999 |
| JP | 2002313317 A | 10/2002 |
| JP | 2005-19143 | 1/2005 |
| JP | 2005197148 A | 7/2005 |
| JP | 2005-228605 A | 8/2005 |
| JP | 2008071601 A | 3/2008 |
| JP | 2009176600 A | 8/2009 |
| JP | 2009231180 A | 10/2009 |
| JP | 2015-050113 A1 | 3/2015 |
| JP | 2015050114 A | 3/2015 |
| JP | 6427707 B1 * | 11/2018 |
| JP | 2019023999 A | 2/2019 |
| JP | 2020004635 A | 1/2020 |
| KR | 10-1315186 B1 | 10/2013 |
| WO | 2012/117502 A1 | 9/2012 |
| WO | 2015/092960 A1 | 6/2015 |

OTHER PUBLICATIONS

English translation of Hasegawa et al. (JP-2008071601-A). (Year: 2008).*

English translation of Tanaka et al. (JP-2015050114-A). (Year: 2015).*

Rajendra et al. "Analysis of Bolt Torquing" accessed via web on Sep. 15, 2023 at <https://pdhonline.com/courses/s149/Bolt_Analysis.htm>. (Year: 2020).*

International Search Report (ISR) dated Nov. 24, 2020 filed in PCT/JP2020/033731.

Final Office Action (FOA) of U.S. Appl. No. 17/760,935 dated Oct. 4, 2023.

* cited by examiner

VENT PLUG FOR LEAD-ACID BATTERY AND LEAD-ACID BATTERY

TECHNICAL FIELD

The present invention relates to a vent plug for a lead-acid battery and a lead-acid battery.

BACKGROUND ART

Lead-acid batteries are in use for various applications, including automotive and industrial applications. A lead-acid battery includes an element in which a positive electrode plate and a negative electrode plate are alternately stacked with a separator interposed therebetween. In the lead-acid battery, the element is immersed in an electrolyte solution held in a container, and an opening portion of the container is sealed by a lid body. Some of such lead-acid batteries include a lid provided with a vent plug for replenishing an electrolyte solution. The vent plug includes a cylindrical body whose lower end is opened and a head portion that seals an upper end of the cylindrical body. In some vent plugs, a through hole for connecting with an exhaust path communicating with a vent hole provided in the lid is formed. The through hole, the exhaust path, and the vent hole have a function of discharging oxygen gas and hydrogen gas generated in plates in the container during charging of the lead-acid battery to the outside of the lead-acid battery.

Meanwhile, in a lead-acid battery, gas generated on plates during charging of the lead-acid battery is present as bubbles in an electrolyte solution, so that a liquid level rise of the electrolyte solution may occur. When the liquid level of the electrolyte solution reaches the bottom portion of the cylindrical body due to the liquid level rise, the opening of the bottom portion is closed by the electrolyte solution. Then, the inside of the cylindrical body of the vent plug and the outside of the cylindrical body do not communicate with each other, and an exhaust path of the gas generated in the container is blocked. When the exhaust path of the gas is blocked, the electrolyte solution around the vent plug is pushed down by the pressure of the gas staying in the container, and the pushed down electrolyte solution enters the inside of the cylindrical body of the vent plug and enters the exhaust path through the through hole, and as a result, the electrolyte solution may overflow to the outside of the lead-acid battery. In order to suppress the overflow due to the liquid level rise accompanying such gas generation, a pair of slits extending upward from the bottom portion of the cylindrical body to the same position is conventionally formed in the cylindrical body.

For example, Patent Document 1 discloses a liquid plug for a lead-acid battery in which an upper end of a slit is set at a position as high as possible so that an electrolyte solution is less likely to overflow when gas is generated.

PRIOR ART DOCUMENT

Patent Document

Patent Document 1: JP-A-2008-71601

SUMMARY OF THE INVENTION

Problems to be Solved by the Invention

In recent years, for the purpose of increasing the capacity of a lead-acid battery, a lead-acid battery in which the liquid level height of an electrolyte solution is increased as compared with the conventional case has been developed. When the liquid level height of the electrolyte solution is increased, the distance between the liquid level of the electrolyte solution and the bottom portion of the cylindrical body of the vent plug is shortened. As a result, there is a problem that the electrolyte solution easily overflows.

The present invention has been made in view of the above problems, and an object thereof is to provide a vent plug for a lead-acid battery and a lead-acid battery in which overflow is less likely to occur.

Means for Solving the Problems

In order to solve the above problems, a vent plug for a lead-acid battery according to the present invention is a vent plug for a lead-acid battery including a head portion, a cylindrical portion extending from the head portion, and a filter provided inside the cylindrical portion, in which, in a case where an end portion of the cylindrical portion on the head portion side is defined as a first end portion, and an end portion of the cylindrical portion on a side opposite to the first end portion is defined as a second end portion, the cylindrical portion includes: a cylinder portion; a screw thread portion having a spiral shape and provided on an outer peripheral surface of the cylinder portion; a slit; and a through hole that allows an inside and an outside of the cylinder portion to communicate with each other, in which the filter is disposed at a position where the through hole is provided in an axial direction of the cylindrical portion, in which the screw thread portion is provided discontinuously in a circumferential direction (by the slit), and in which, in a case where a circumferential position where a start end portion, which is an end portion of the screw thread portion on the second end portion side, is located is defined as a first circumferential position, and a screw thread located closer to the first end portion side than the start end portion at the first circumferential position and located closest to the second end portion side is defined as a first-peripheral screw thread portion, the screw thread portion intersects the slit only at the first-peripheral screw thread portion when the slit is viewed in a plan view from a radially outer side of the cylindrical portion.

MODE FOR CARRYING OUT THE INVENTION

Hereinafter, embodiments of the present invention will be described in detail with reference to the drawings.

[Schematic Configuration of Lead-Acid Battery 100]

Figure 1:
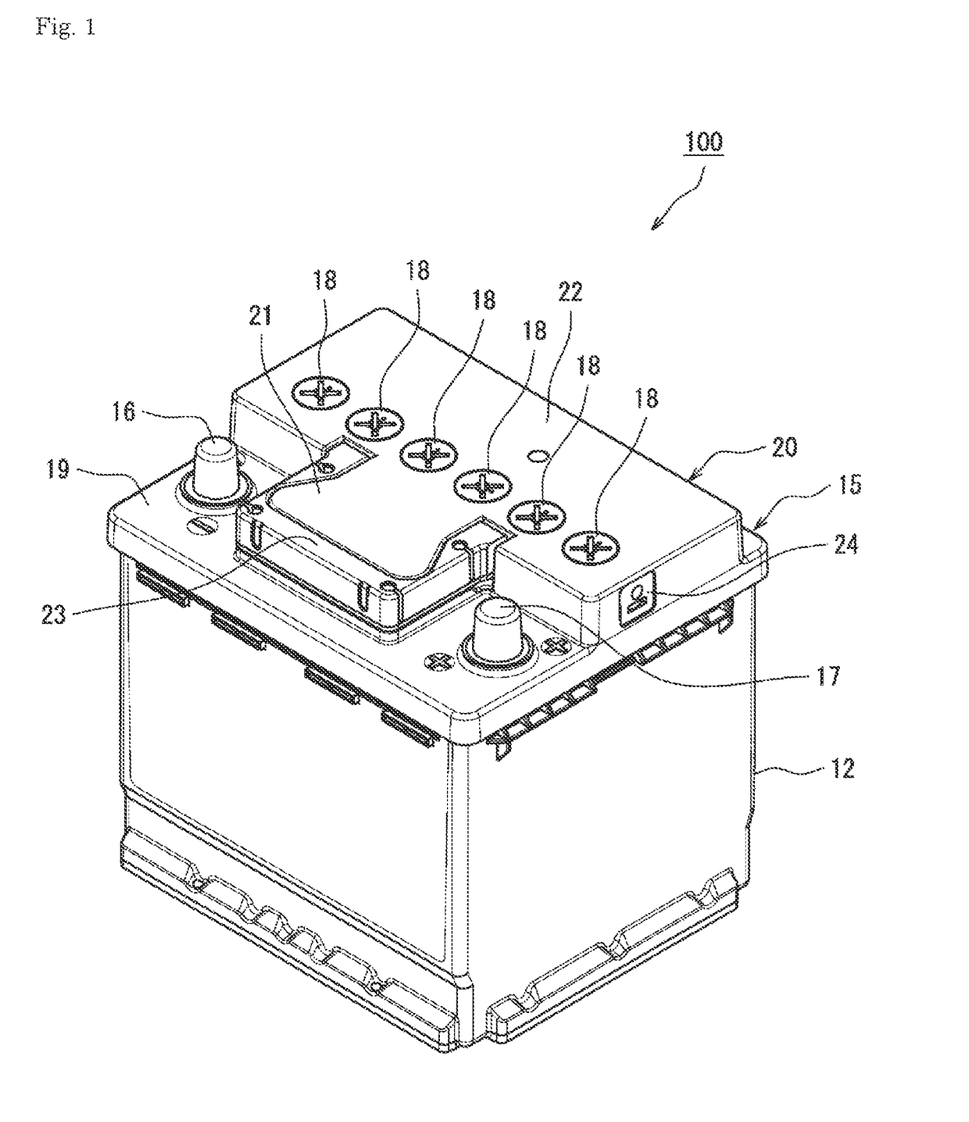
FIG. 1 is a perspective view showing a lead-acid battery 100 according to an embodiment of the present invention.

FIG. 1 is a perspective view showing a lead-acid battery 100 according to an embodiment of the present invention. As shown in FIG. 1, the lead-acid battery 100 includes a plurality of elements (not shown), an electrolyte solution (not shown), a container 12 which accommodates the elements and the electrolyte solution and has an opening on the upper side, and a lid 15 which seals the opening of the container 12.

The container 12 is a substantially rectangular parallelepiped case having the opening on the upper surface, and is formed of, for example, a synthetic resin. The container 12 has a partition wall. The inside of the container is partitioned into a plurality of cell chambers arranged in a predetermined direction by the partition wall. An element is disposed in each of the plurality of cell chambers.

The opening of the container 12 is sealed with the lid 15 having a shape corresponding to the opening. More specifically, the peripheral edge portion of the lower surface of the lid 15 and the peripheral edge portion of the opening portion of the container 12 are joined to each other by, for example, thermal welding. The lid 15 includes a base portion 19 and a plateau portion 20 projecting from the base portion 19. A negative electrode terminal 16 and a positive electrode terminal 17 are provided at the base portion of the lid 15.

The plateau portion 20 of the lid 15 includes a first projecting portion 21 projecting between the positive electrode terminal 17 and the negative electrode terminal 16, and a second projecting portion 22 extending in parallel with the arrangement direction of the positive electrode terminal 17 and the negative electrode terminal 16. The plateau portion 20 includes a handle 23 for a user of the lead-acid battery 100 to grip the lead-acid battery 100.

The second projecting portion 22 is provided with water filling ports at positions corresponding to the cell chambers, and the lid 15 is provided with vent plugs 18 for sealing the water filling ports. In the example shown in FIG. 1, the lid 15 includes six vent plugs. When water addition is performed on the lead-acid battery 100, the vent plugs 18 are removed and refilling liquid is added.

A vent hole 24 is provided in a side surface of the second projecting portion 22 of the lid 15. The vent hole 24 is connected to an exhaust path (not shown) provided in the lid 15, and discharges gas generated in each cell chamber to the outside. In addition, the vent hole 24 is provided at an end portion in the arrangement direction in which the vent plugs 18 are arranged when the lid 15 is viewed from the top. In other words, the vent hole 24 is provided such that the vent plugs 18 and the vent hole 24 are on a straight line.

[Schematic Configuration of Vent Plug 18]

Figure 2:
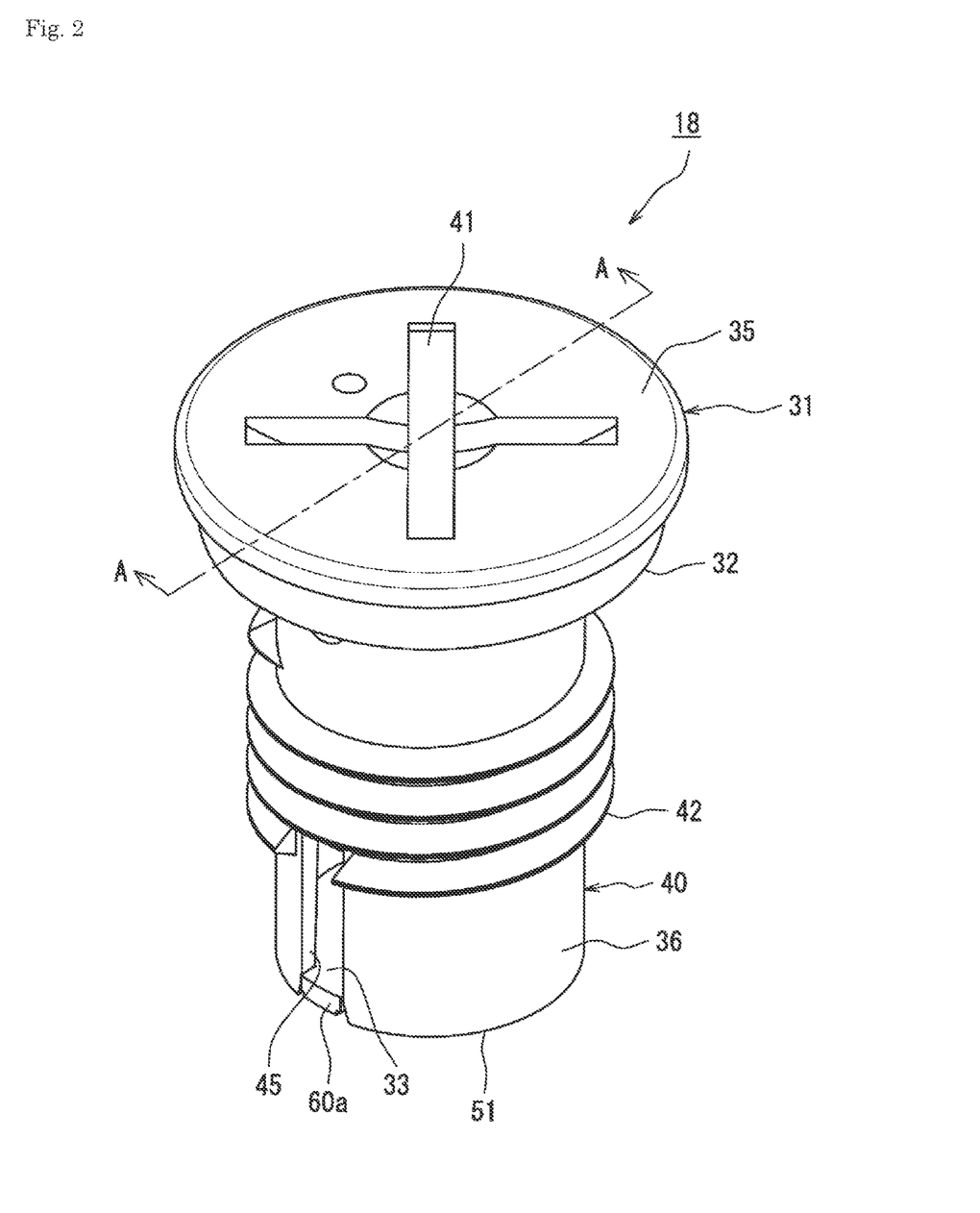
FIG. 2 is a perspective view of a vent plug 18 according to the embodiment of the present invention.
Figure 3:
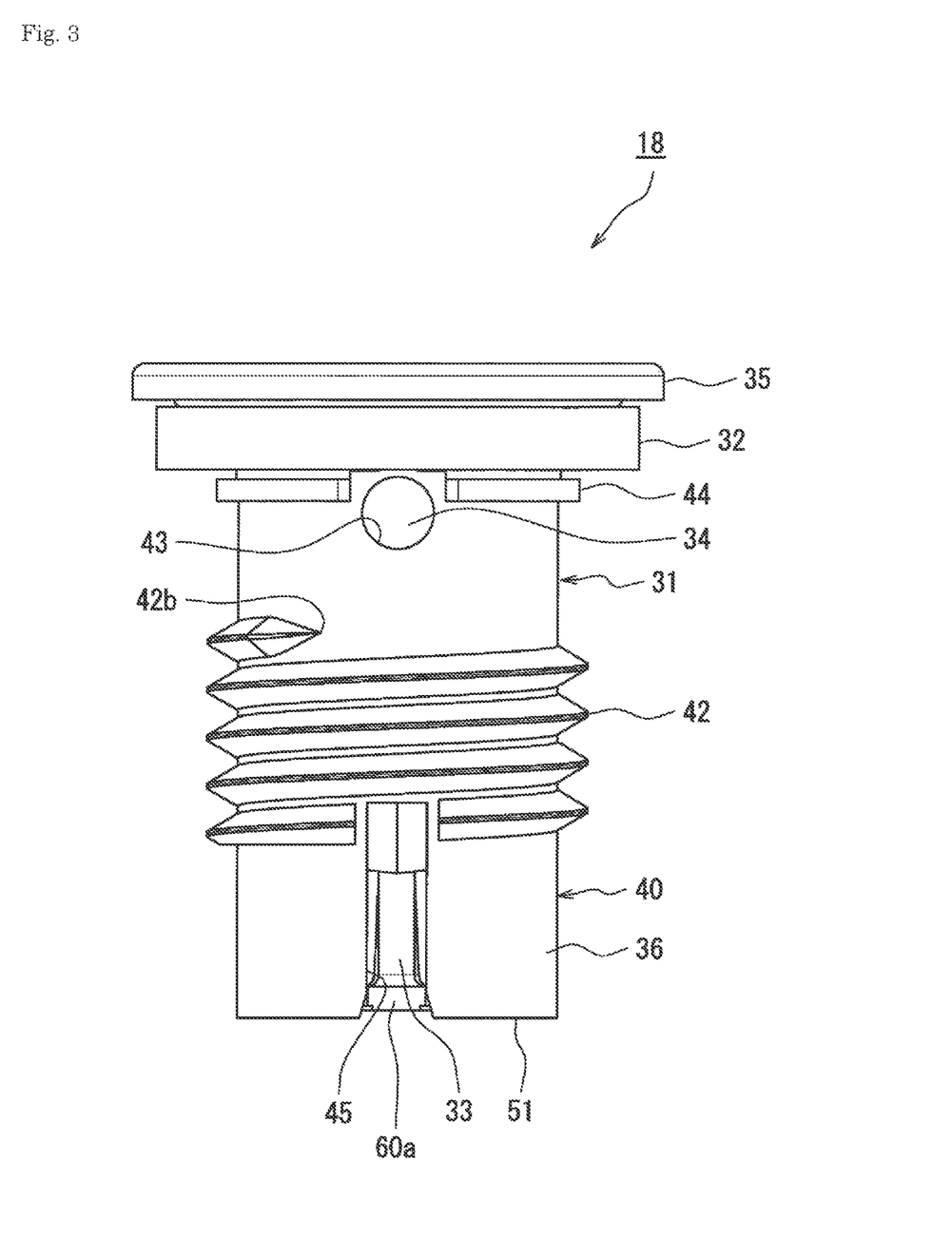
FIG. 3 is a front view of the vent plug 18 shown in FIG. 2.
Figure 4:
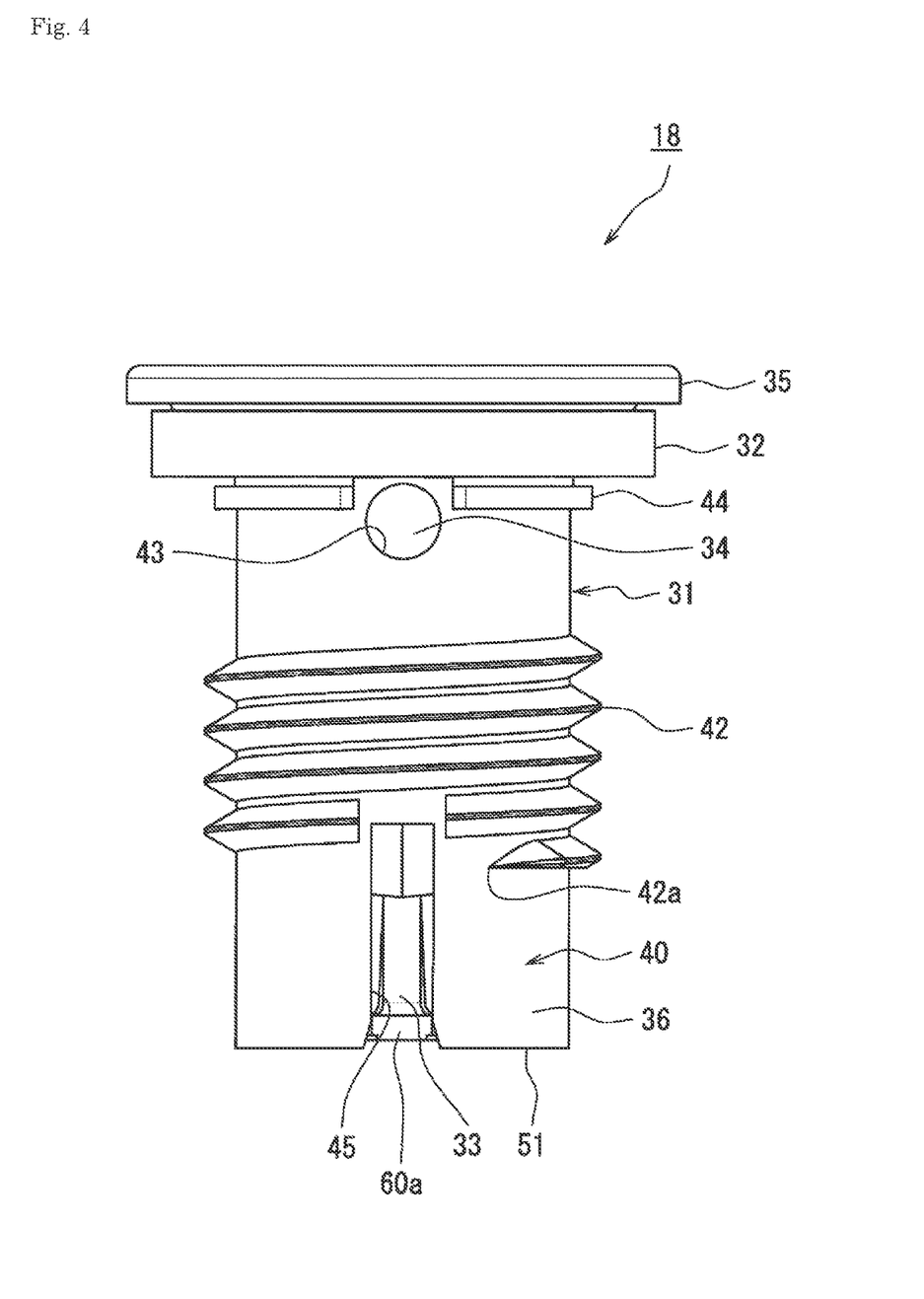
FIG. 4 is a rear view of the vent plug 18 shown in FIG. 2.
Figure 5:
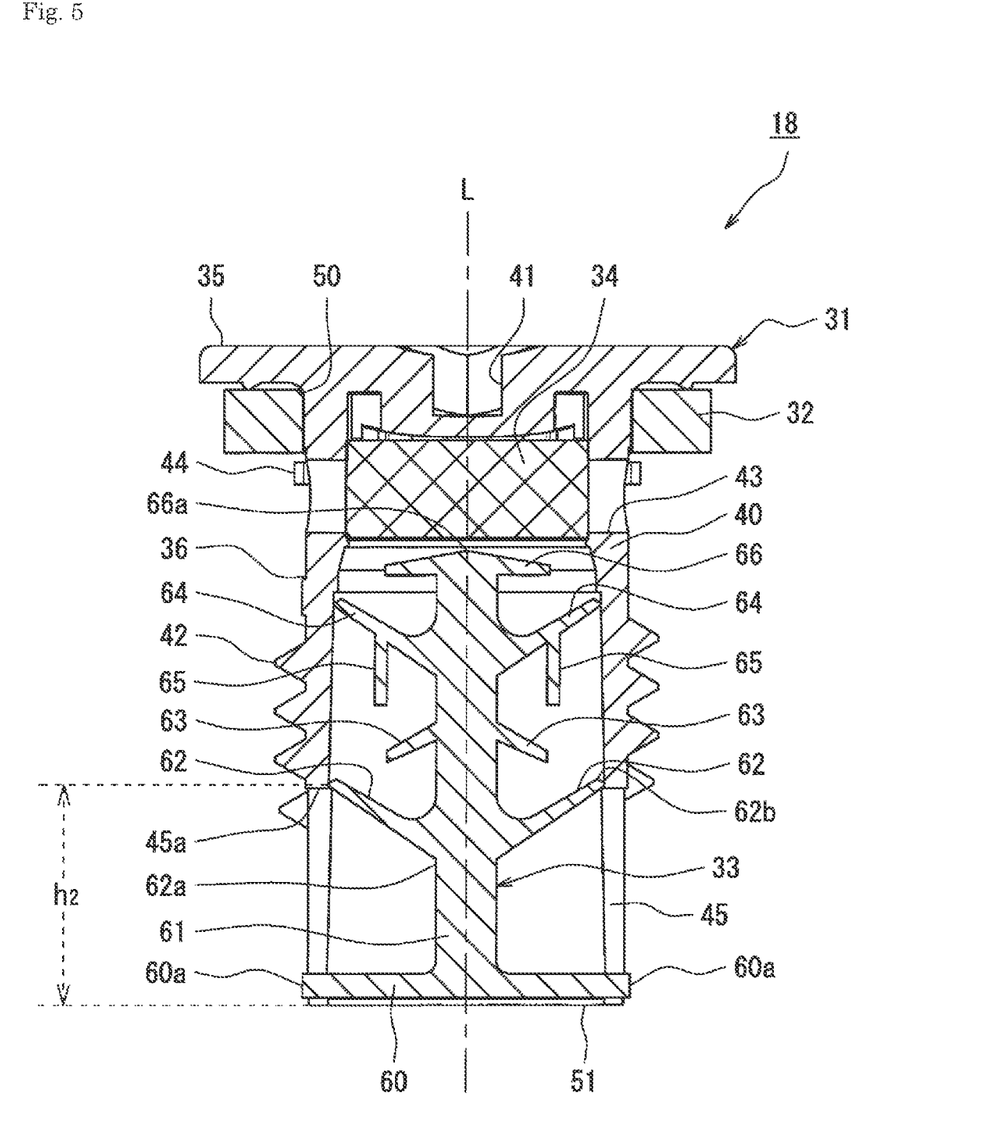
FIG. 5 is a cross-sectional view taken along line A-A2 in FIG. 2, and is a view showing an internal structure of the vent plug 18.

FIG. 2 is a perspective view of the vent plug 18 according to the embodiment of the present invention. Further. FIG. 3 is a front view of the vent plug 18, and FIG. 4 is a rear view of the vent plug 18. Further, FIG. 5 is a cross-sectional view taken along line A-A in FIG. 2, and is a view showing an internal structure of the vent plug 18.

As shown in FIGS. 2 to 5, the vent plug 18 includes a main body portion 31, a packing 32, a splash-proof body 33, and a filter 34.

The main body portion 31 of the vent plug 18 includes a head portion 35 having a circular plate shape, and a cylindrical portion 36 having a substantially cylindrical shape extending from the head portion 35. A tool hole 41 is formed in the head portion 35 of the vent plug 18. Further, a screw thread portion 42 spirally provided with a screw thread is formed on the outer periphery of the cylindrical portion 36. The vent plug 18 is fixed by screwing the screw thread portion 42 to the water filling port provided in the lid 15. In the lead-acid battery 100, a coin, a screwdriver, or the like having a shape corresponding to the tool hole 41 is inserted into the tool hole 41, and the vent plug 18 is rotated, so that the vent plug 18 can be attached and detached.

The cylindrical portion 36 includes a cylinder portion 40, the screw thread portion 42, and a restricting portion 44. Here, in the cylindrical portion 36, an end portion on the head portion 35 side is referred to as a first end portion 50, and an end portion on a side opposite to the first end portion 50 is referred to as a second end portion 51. That is, the cylindrical portion 36 is connected to and integrated with the head portion 35 at the first end portion 50. The head portion 35 seals the first end portion 50 of the cylindrical portion 36. The cylinder portion 40 of the cylindrical portion 36 is a cylindrical member having a hollow inside in which an end portion on a side opposite to the head portion 35 is opened. The cylindrical portion 36 holds the filter 34 and the splash-proof body 33 inside the cylinder portion 40. The cylinder portion 40 includes through holes 43 and slits 45. Hereinafter, the central axis of the cylindrical portion 36 is defined as a central axis L. and a direction parallel to the central axis L is referred to as an "axial direction of the cylindrical portion 36". In the axial direction of the cylindrical portion 36, a direction from the second end portion 51 toward the first end portion 50 is defined as an upward direction, and a direction from the first end portion 50 toward the second end portion 51 is defined as a downward direction.

The restricting portion 44 is a ring-shaped member partially cut out, and protrudes outward from the cylinder portion 40. The packing 32 is a ring-shaped member made of, for example, synthetic rubber. When the vent plug 18 is attached to the water filling port, the packing 32 ensures the sealing property between the lid 15 and the vent plug 18. The packing 32 is fitted between the head portion 35 and the restricting portion 44. The packing 32 is provided so as to have an outer diameter smaller than that of the head portion 35 and larger than that of the restricting portion 44, and is held at a predetermined position by the restricting portion 44 and the head portion 35.

The through holes 43 allow the inside and the outside of the cylinder portion 40 (cylindrical portion 36) to communicate with each other. Therefore, an opening portion is formed on the inner peripheral surface and the outer peripheral surface of the cylindrical portion 36. The through holes 43 are connected to the exhaust path (not shown) provided in the lid 15. The gas generated in each cell chamber of the lead-acid battery 100 passes from the inside of the cylinder portion 40 to the exhaust path through the through holes 43, and is discharged from the vent hole 24 to the outside. The through holes are provided at two positions facing each other across the central axis L of the cylindrical portion 36.

The slit 45 is provided to extend from the second end portion 51 of the cylindrical portion 36 toward the first end portion 50. In the example shown in FIGS. 2 to 5, the slits 45 are provided at two positions facing each other across the central axis L of the cylindrical portion 36. The width of the slit 45 is substantially uniform over the entire length in the vertical direction. Since the slits 45 are provided in the vent plug 18, even when the liquid level of the electrolyte solution rises beyond the second end portion 51 which is the lowest portion of the cylindrical portion 36, gas passes to the through hole 43 and the exhaust path through the slits 45, so that it is possible to suppress the overflow.

As shown in FIGS. 2 to 5, the through hole 43 and the slit 45 are formed at the same position in the circumferential direction of the outer peripheral surface of the cylindrical portion 36. In the slit 45, an end portion on the first end portion 50 side is defined as an end portion 45a. In the present embodiment, the vent plug 18 in which the through hole 43 and the slit 45 are formed at the same position in the circumferential direction of the outer peripheral surface of the cylindrical portion 36 is shown. However, in the vent plug 18, the positional relationship between the through hole 43 and the vent plug 18 is not limited thereto. That is, the through hole 43 and the slit 45 may be formed at different positions in the circumferential direction of the outer peripheral surface of the cylindrical portion 36.

The screw thread portion 42 is a spiral screw thread provided on the outer peripheral surface of the cylinder portion 40 and protruding outward from the cylinder portion 40. An end portion of the screw thread portion 42 on the second end portion 51 side is defined as a start end portion 42a. Further, an end portion of the screw thread portion 42 on the first end portion 50 side is defined as a terminal end portion 42b. In other words, the start end portion 42a and the terminal end portion 42b are a start end portion and a terminal end of the screw thread portion 42 provided on the outer periphery of the cylinder portion 40 so as to draw a spiral from the second end portion 51 side to the first end portion 50 side.

As shown in FIGS. 2 to 5, in the vent plug 18, the slit 45 and the screw thread portion 42 are provided in an overlapping region of the outer peripheral surface of the cylinder portion 40. That is, in the screw thread portion 42, the screw thread is discontinuously provided. This point will be described with reference to FIG. 6.

Figure 6:
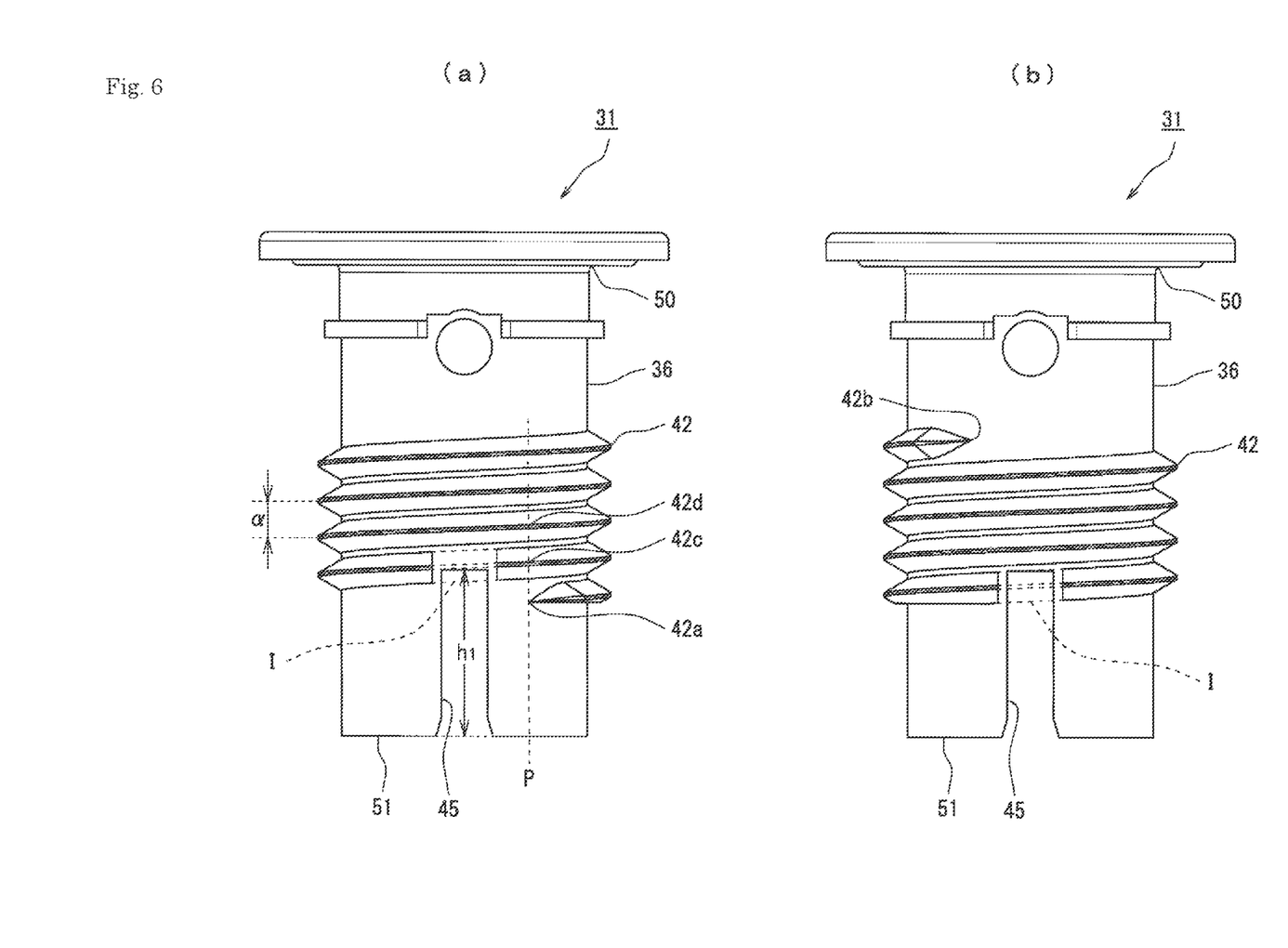
FIG. 6 is a view showing a relationship between a slit 45 and a screw thread portion 42, in which FIG. 6(*a*) is a rear view of a main body portion 31 of the vent plug 18, and FIG. 6(*b*) is a front view of the main body portion 31 of the vent plug 18.

FIG. 6 is a view showing the relationship between the slit 45 and the screw thread portion 42, FIG. 6(a) is a rear view of the main body portion 31 of the vent plug 18, and FIG. 6(b) is a front view of the main body portion 31 of the vent plug 18. Here, the circumferential position in the cylindrical portion 36 at which the start end portion 42a of the screw thread portion 42 is provided is referred to as a first circumferential position P. In the screw thread portion 42 at the first circumferential position P, a screw thread located closer to the first end portion 50 than the start end portion 42a and closest to the second end portion 51 is referred to as a first intermediate screw thread portion 42c. Further, in the screw thread portion 42 at the first circumferential position P, a screw thread located closer to the first end portion 50 than the first intermediate screw thread portion 42c and located closest to the second end portion 51 is referred to as a second intermediate screw thread portion 42d. In other words, the first intermediate screw thread portion 42c is located at a position where the screw thread is advanced from the start end portion 42a toward the first end portion 50 in the screw thread portion by one period (360 degrees) spirally. Further, the second intermediate screw thread portion 42d is located at a position where the screw thread advances from the first intermediate screw thread portion 42c toward the first end portion 50 in the screw thread portion 42 by one period (360 degrees) spirally.

Here, the screw thread portion 42 from the start end portion 42a to the first intermediate screw thread portion 42c is referred to as a first-peripheral screw thread portion. Further, the screw thread portion 42 from the first intermediate screw thread portion 42c to the second intermediate screw thread portion 42d is referred to as a second-peripheral screw thread portion. As shown in FIG. 6 and the like, the screw thread portion 42 is discontinuously provided by the cylindrical portion 36 including the slits 45. That is, the screw thread portion 42 has a region where the screw thread portion 42 is not present between the start end portion 42a and the terminal end portion 42b. In such a region, a screw thread in a case where it is assumed that the screw thread portion 42 is continuously provided in the same shape as the place where the screw thread portion 42 is present is defined as a virtual screw thread portion I (see FIG. 6). The "first-peripheral screw thread portion" includes not only the screw thread portion 42 but also the virtual screw thread portion I present from the start end portion 42a to the first intermediate screw thread portion 42c.

In the vent plug 18 according to the present embodiment, when the slit 45 is viewed in a plan view from the radially outer side of the cylinder portion 40, the screw thread portion 42 intersects the slit 45 only at the first-peripheral screw thread portion. In addition, the virtual screw thread portion I is provided in the first-peripheral screw thread portion, and the end portion 45a of the slit 45 is located closer to the first end portion 50 than the end portion of the virtual screw thread portion on the second end portion 51 side when compared with the virtual screw thread portion I provided at the same circumferential position. Further, the end portion 45a of the slit 45 is located closer to the second end portion 51 than the end portion of the virtual screw thread portion on the first end portion 50 side. In other words, the slit 45 is provided so as to cover the first-peripheral screw thread portion, but is provided so as not to cover the second-peripheral screw thread portion.

The filter 34 is a sintered body of ceramics such as alumina or a sintered body of resin particles such as polypropylene, and is a porous body. The filter 34 is an explosion-proof filter, and suppresses intrusion of sparks or the like generated outside into the container 12. As shown in FIGS. 3 to 5, the filter 34 is held inside the cylinder portion 40 of the cylindrical portion 36. The filter 34 is further disposed at a position where the through holes 43 are provided in the axial direction of the cylindrical portion 36.

The splash-proof body 33 is held inside the cylinder portion of the cylindrical portion 36. The splash-proof body 33 is integrally formed of, for example, resin. As shown in FIG. 5, the splash-proof body 33 includes a bottom portion 60, a support column portion 61, first splash-proof plates 62, second splash-proof plates 63, third splash-proof plates 64, fourth splash-proof plates 65, and fifth splash-proof bodies 66. Since the splash-proof body 33 includes the first splash-proof plates 62 to the fifth splash-proof plates 66, an exhaust path of gas has a labyrinthine shape inside the cylindrical portion 36. As a result, the gas generated in the container 12 passes through the inside of the cylindrical body 36 and is discharged to the outside, whereas the electrolyte solution does not easily leak out. Hereinafter, the first splash-proof plates 62 to the fifth splash-proof plates 66 may be collectively referred to as a plurality of splash-proof plates.

The bottom portion 60 is a circular plate-shaped member and is provided to seal the second end portion 51 of the cylindrical portion 36. The diameter of the bottom portion 60 is slightly larger than the inner diameter of the cylindrical portion 36 at the second end portion 51, and the bottom portion 60 of the splash-proof body 33 is press-fitted into the second end portion 51 of the cylindrical portion 36. Thus, the splash-proof body 33 is locked inside the cylindrical portion 36. On the outer peripheral surface of the bottom portion 60, convex parts 60a projecting outward in the circumferential direction are formed at positions corresponding to the slits 45. The convex parts 60a are formed at two positions corresponding to the slits 45. In the vent plug 18, the splash-proof body 33 is press-fitted into the cylindrical portion 36 such that the convex parts 60a are inserted into the slits 45, thereby defining a direction in which the splash-proof body 33 is held in the cylindrical portion 36. The support column portion 61 is a rod-shaped body extending from the center of the bottom portion 60 toward the first end portion side in parallel with the axial direction of the cylindrical portion 36.

The first splash-proof plates 62 are splash-proof plates located closest to the second end portion 51 among the plurality of splash-proof plates included in the splash-proof body 33. A pair of the first splash-proof plates 62 is formed so as to face each other across the central axis L of the cylindrical portion 36. The first splash-proof plate 62 has a substantially semicircular plate shape, and is disposed such that a semicircular straight portion is connected to the support column portion 61 and an arc faces outward. The first splash-proof plate 62 is disposed so as to extend obliquely upward from the support column portion 61.

In the first splash-proof plate 62, a lowermost portion connected to the support column portion 61 is defined as a base portion 62a. In the first splash-proof plate 62, an upper end portion 62b located on the uppermost side (first end portion 50 side) is located above (on the first end portion 50 side of) the end portion 45a of the slit 45. Here, assuming that the axial distance of the cylindrical portion 36 from the second end portion 51 to the upper end portion 62b of the first splash-proof plate 62 is a distance $h_2$, the distance $h_2$ satisfies the following relational expression between the distance $h_1$ representing the depth of the slit 45 and a pitch $\alpha$ of the screw thread portion 42.

$$h_1 < h_2 < h_1 + \alpha \quad (1)$$

A case is considered in which the distance $h_2$ is equal to or less than the distance $h_1$, that is, a case where the depth of the slit 45 is equal to the distance to the upper end portion 62b of the first splash-proof plate 62 or shorter than the distance to the upper end portion 62b of the first splash-proof plate 62. In such a case, since the end portion 45a of the slit 45 is located closer to the first end portion 50 than the upper end portion of the first splash-proof plate 62, the electrolyte solution easily enters the inside of the cylindrical body 36 from above the first splash-proof body 62 due to vibration or the like. When vibration or the like is further applied to the lead-acid battery 100, the electrolyte solution that has entered the inside of the cylindrical body 36 may flow up in the cylindrical body 36 and overflow.

Considering the case where the distance $h_2$ is greater than or equal to $h_1 + \alpha$, the distance in the axis L direction from the upper end portion 62b of the first splash-proof plate 62 to the end portion 45a of the slit 45 increases. Therefore, as compared with the case where the distance $h_2$ is less than $h_1 + \alpha$, the electrolyte solution that has entered the inside of the cylindrical body 36 due to vibration or the like easily hits the inner wall portion of the cylindrical body 36, and the electrolyte solution that has entered the inside of the cylindrical body 36 is less likely to be discharged to the outside of the cylindrical body 36. Also in this case, as in the case described above, when vibration or the like is further applied to the electrolyte solution that has entered the cylindrical body 36, the electrolyte solution may flow up in the cylindrical body 36 and overflow.

As described above, since the vent plug 18 satisfies the above relational expression (1), the vent plug 18 is less likely to cause overflow due to vibration or the like (excellent in dynamic overflow performance).

In the vent plug 18, the upper end portion 62b of the first splash-proof plate 62 is located closer to the first end portion 50 (on the upper side) than the start end portion 42a of the screw thread portion 42.

The second splash-proof plate 63 is provided above the first splash-proof plate 62 (on the first end portion 50 side) and has a substantially rectangular flat plate shape. A pair of the second splash-proof plates 63 is formed so as to face each other across the central axis L of the cylindrical portion 36, and is disposed so as to extend obliquely downward from the support column portion 61.

The third splash-proof plate 64 is provided above the second splash-proof plate 63 and has substantially the same shape as the first splash-proof plate 62. That is, a pair of the third splash-proof plates 64 is formed so as to face each other across the central axis L of the cylindrical portion 36. The third splash-proof plate 64 has a substantially semicircular plate shape, and is disposed such that a chord is connected to the support column portion 61 and an arc faces outward. The third splash-proof plate 64 is disposed so as to extend obliquely upward from the support column portion 61. Also in the third splash-proof plate 64, similarly to the first splash-proof plate 62, a lowermost portion connected to the support column portion 61 is referred to as a base portion, and a portion located on the uppermost side (first end portion 50 side) is referred to as an upper end portion.

The fourth splash-proof plate 65 is provided to extend downward from between the base portion and the upper end portion of the third splash-proof plate 64. The fourth splash-proof plate has a substantially rectangular flat plate shape. A pair of the fourth splash-proof plates 65 is formed so as to face each other across the central axis L of the cylindrical portion 36.

The fifth splash-proof plate 66 is provided above the third splash-proof plate 64 and is connected to the top portion of the support column portion 61. An upper end portion 66a of the fifth splash-proof plate 66, which is an end portion on the first end portion 50 side, is an end portion of the splash-proof body 33 on the first end portion 50 side. The upper end portion 66a is located closer to the first end portion 50 than the upper end portion 42b of the screw thread portion 42.

In the vent plug 18 according to the present embodiment, the filter 34 is disposed at the position where the through holes 43 are provided in the axial direction of the cylindrical portion 36, and the axial distance from the end portion of the through hole 43 on the second end portion 51 side to the upper end portion 66a which is the end portion of the splash-proof body 33 on the first end portion 50 side is 4.0 mm or less.

The present invention is not limited to the above-described embodiments, and various modifications can be made within the scope indicated in the claims, and embodiments obtained by appropriately combining technical means disclosed in different embodiments are also included in the technical scope of the present invention.

SUMMARY (1) A vent plug for a lead-acid battery according to an aspect of the present invention may be a vent plug 18 for a lead-acid battery including a head portion 35, a cylindrical portion 36 extending from the head portion 35, and a filter 34 provided inside the cylindrical portion 36. In a case where an end portion of the cylindrical portion 36 on the head portion 35 side is defined as a first end portion 50, and an end portion of the cylindrical portion on a side opposite to the first end portion 50 is defined as a second end portion 51, the cylindrical portion 36 may include: a cylinder portion 40; a screw thread portion 42 having a spiral shape and provided on an outer peripheral surface of the cylinder portion 40; a slit 45; and a through hole 43 that allows an inside and an outside of the cylinder portion 40 to communicate with each other. The filter 34 may be disposed at a position where the through hole 43 is provided in an axial (central axis L) direction of the cylindrical portion 36. In a case where a circumferential position where a start end portion 42a, which is an end portion of the screw thread portion 42 on the second end portion 51 side, is located is defined as a first circumferential position P, and a screw thread located closer to the first end portion 50 side from the start end portion 42a than the start end portion 42a at the first circumferential position P and located closest to the second end portion 51 side is defined as a first-peripheral screw thread portion, the screw thread portion 42 may intersect the slit 45 only at the first-peripheral screw thread portion when the cylindrical portion 36 is viewed in a plan view from a radially outer side of the cylinder portion 40.

In the vent plug 18 according to the present embodiment, when the cylindrical portion 36 is viewed in a plan view from the radially outer side of the cylinder portion 40, the screw thread portion 42 intersects the slit 45 only at the first-peripheral screw thread portion. That is, the slit 45 is provided so as to cut out the first circumference of the screw thread portion 42. As described above, the axial length of the cylindrical portion 36 can be shortened by overlapping the region where the slit 45 and the screw thread portion 42 are formed. Therefore, the axial length of the vent plug 18 can be shortened, and in the lead-acid battery 100, the distance from the liquid level of the electrolyte solution to the lower end of the vent plug 18 can be made longer than that in the conventional case. In the lead-acid battery 100, by making the distance from the liquid level of the electrolyte solution to the lower end of the vent plug 18 longer than that in the conventional case, even if the liquid level of the electrolyte solution rises during charging, the electrolyte solution is less likely to enter the inside of the vent plug 18. Therefore, it is possible to provide the vent plug 18 in which overflow is less likely to occur than the conventional case.

In addition, in a case where the axial length of the vent plug 18 is shortened and the distance from the liquid level of the electrolyte solution to the vent plug 18 is set to be equal to that in the conventional case, the liquid level height of the electrolyte solution can be increased as compared with the conventional case, and the capacity of the lead-acid battery 100 can be increased.

Furthermore, since the slit 45 is provided so as to cut out only the first circumference of the screw thread portion 42, the influence on the tightening condition of the vent plug 18 when the vent plug 18 is fixed to the water filling port That is, in a case where the slit 45 is provided so as to cut out the second and subsequent circumferences of the screw thread portion 42, the vent plug may be mounted in an inclined manner when the vent plug 18 is attached to the water filling port, and there is a possibility that the sealing property between the lid 15 and the vent plug 18 is not secured. In addition, in a case where the depth of the slit 45 is set to a depth that also intersects the second-peripheral screw thread portion, the second end portion 51 of the cylindrical portion 36 is easily deformed radially outward of the cylindrical portion 36, so that the fitting force between the cylindrical portion 36 and the bottom portion 60 of the splash-proof body 33 is weakened. Therefore, when the lead-acid battery 100 is used, the splash-proof body 33 may fall from the cylindrical portion 36 due to vibration or the like.

According to the above configuration, even when the axial length of the vent plug 18 is shortened, the axial length of the region where the screw thread portion 42 is formed may not be changed. Here, considering the case of detaching the vent plug 18 from the lead-acid battery 100, the screw of the vent plug 18 is unscrewed, and the head portion of the vent plug 18 is pinched and detached. At this time, the amount by which the vent plug 18 projects from the plateau portion 20 of the lid 15 depends on the axial length of the region where the screw thread portion 42 is formed. Therefore, in the vent plug 18 according to the present embodiment, it is not necessary to change the axial length of the region where the screw thread portion 42 is formed, so that the height at which the vent plug 18 projects from the plateau portion 20 is the same as that in the conventional case, and it is not difficult for an operator to remove (pinch) the vent plug 18.

Furthermore, in the vent plug 18 according to the present embodiment, the filter 34 is disposed at a position where the through holes 43 are provided in the axial direction of the cylindrical portion 36. That is, the filter 34 is disposed so as to cover the through holes 43. Here, a case is considered in which the filter 34 is disposed at an axial position different from those of the through holes 43. Since the filter 34 needs to be disposed between the vent hole 24 of the lead-acid battery 100 and the inside of the container 12, the filter 34 is disposed closer to the container 12 (second end portion 51 side) than the through holes 43. That is, in the vent plug 18 according to the present embodiment, since the filter 34 is disposed at the position where the through holes 43 are provided in the axial direction of the cylindrical portion 36, the splash-proof body 33 can be disposed at a position (upper side) farther from the liquid level as compared with the case where the filter 34 is provided at a height position different from the through holes 43.

Here, the gas generated in the container 12 passes through the labyrinthine exhaust path constituted by the splash-proof body 33 and the inner peripheral surface of the cylinder portion 40 of the cylindrical portion 36, and is discharged to the outside of the lead-acid battery 100. Therefore, when the liquid level rises to such a height that the base portion 62a of the first splash-proof plate 62, which is the inlet of the exhaust path, of the splash-proof body 33 is immersed in the electrolyte solution, the gas generated in the container 12 is not discharged to the outside. According to the vent plug 18 of the present embodiment, the splash-proof body 33 can be disposed at a position (upper side) farther from the liquid level. Therefore, in the vent plug 18 according to the present embodiment, overflow can be prevented even at a liquid level height at which overflow occurs conventionally. As a result, it is possible to provide the vent plug 18 in which overflow is less likely to occur than the conventional case.

The description that "the filter 34 is disposed at a position where the through hole 43 is provided in an axial (central axis L) direction of the cylindrical portion 36" includes both a case where the filter 34 is provided so as to cover the entire through hole 43 and a case where the filter 43 is provided so as to cover at least a part of the through hole 43. In addition, intersecting the slit 45 means being provided in a region overlapping the region where the slit 45 is provided when viewed in a plan view.

The term "slit" is not limited to a slit extending from the second end portion 51 of the cylindrical portion 36 toward the first end portion 50. That is, the shape of the "slit" is not particularly limited, and the shape is not particularly limited as long as it has a function of introducing the gas generated in the container 12 from the outside to the inside of the cylindrical portion 36 and allows the inside and the outside of the cylindrical portion 36 to communicate with each other. For example, the "slit" also includes a hole provided in the cylindrical portion 36 in which the end portion on the second end portion 51 side does not reach the second end portion 51. Further, in the above-described embodiment, only the slit extending parallel to the central axis L is shown, but the slit may be formed on the outer peripheral surface of the cylinder portion 40 of the cylindrical portion 36 so as to intersect the central axis L.

(2) The vent plug 18 according to an aspect of the present invention may further include a splash-proof body 33 having a plurality of splash-proof plates, and an end portion (upper end portion 62b) on the first end portion 50 side of the first splash-proof plate 62 closest to the second end portion 51 among the plurality of splash-proof plates may be located closer to the first end portion 50 than the start end portion 42a in the axial (central axis L) direction.

(3) The vent plug 18 according to an aspect of the present invention may further include a splash-proof body 33 having a plurality of splash-proof plates, and an end portion (upper end portion 66a) located closest to the first end portion among the plurality of splash plates may be located closer to the first end portion 50 than an end portion (terminal end portion 42b) of the screw thread portion 42 on the first end 50 portion side in the axial (central axis L) direction.

(4) In the vent plug 18 according to an aspect of the present invention, the slit 45 and the through hole 43 may be formed at the same circumferential position on the outer peripheral surface. The description "formed at the same circumferential position" means that the circumferential center of the slit 45 and the circumferential center of the through hole 43 are at the same circumferential position. In a case where a plurality of slits 45 and a plurality of through holes 43 are provided, the through holes 43 are formed at positions corresponding to the slits 45, and the slits 45 and the corresponding through holes 43 may be at the same circumferential positions.

(5) A lead-acid battery 100 according to an aspect of the present invention may be a vent plug 18 for a lead-acid battery including a head portion 35, a cylindrical portion 36 extending from the head portion 35, a filter 34 provided inside the cylindrical portion 36, and a splash-proof body 33 provided inside the cylindrical portion 36. The cylindrical portion 36 may include a through hole 43 that allows an inside and an outside of the cylindrical portion 36 to communicate with each other. The filter 34 may be disposed at a position where the through hole 43 is provided in an axial (central axis L) direction of the cylindrical portion 36. In a case where an end portion of the cylindrical portion 36 on the head portion side 35 is defined as a first end portion 50, and an end portion of the cylindrical portion 36 on a side opposite to the first end portion 50 is defined as a second end portion 51, an axial distance from an end portion of the through hole 43 on the second end portion 51 side to an upper end portion 66a which is an end portion of the splash-proof body 33 on the first end portion 50 side may be 4.0 mm or less.

According to the above configuration, as compared with a case where the filter 34 is not disposed at the position where the through hole 43 is provided or a case where the axial distance from the end portion of the through hole 43 on the second end portion 51 side to the upper end portion 66a which is an end portion of the splash-proof body 33 on the first end portion 50 side exceeds 4.0 mm, the splash-proof body 33 can be disposed at a position (upper side) farther from the liquid level. Therefore, as described above, the axial length of the vent plug 18 can be shortened. As a result, it is possible to prevent overflow even at a liquid level height at which overflow occurs conventionally, and it is possible to provide the vent plug 18 in which overflow is less likely to occur than the conventional case.

(6) The lead-acid battery 100 according to an aspect of the present invention may include the vent plug 18 described above.

DESCRIPTION OF REFERENCE SIGNS

18: vent plug (vent plug for lead-acid battery)
33: splash-proof body
34: filter
35: head portion
36: cylindrical portion
40: cylinder portion
42: screw thread portion
42a: start end portion
42b: terminal end portion
43: through hole
45: slit
45a: end portion
50: first end portion
51: second end portion
62: first splash-proof plate
62b: upper end portion (end portion)
66: fifth splash-proof plate
66a: upper end portion (end portion)
100: lead-acid battery
L: central axis (axis)
P: first circumferential position

The invention claimed is:
1. A vent plug for a lead-acid battery comprising:
a head portion;
a cylindrical portion extending from the head portion; and
a filter provided inside the cylindrical portion,
wherein, in a case where an end portion of the cylindrical portion on the head portion side is defined as a first end portion, and an end portion of the cylindrical portion on a side opposite to the first end portion is defined as a second end portion,
the cylindrical portion includes:
a cylinder portion;
a screw thread portion having a spiral shape and provided on an outer peripheral surface of the cylinder portion;
a slit; and
a through hole that allows an inside and an outside of the cylinder portion to communicate with each other,
wherein the filter is disposed at a position where the through hole is provided in an axial direction of the cylindrical portion,
wherein, in a case where a circumferential position where a start end portion, which is an end portion of the screw thread portion on the second end portion side, is located is defined as a first circumferential position, and a screw thread located closer to the first end portion side from the start end portion than the start end portion at the first circumferential position and located closest to the second end portion side is defined as a first-peripheral screw thread portion, the screw thread portion intersects the slit only at the first-peripheral screw thread portion when the cylindrical portion is viewed in a plan view from a radially outer side of the cylinder portion, and wherein the first peripheral screw thread portion is cut out and divided by the slit where the screw thread portion intersects the slit.

2. The vent plug for a lead-acid battery according to claim 1, further comprising a splash-proof body having a plurality of splash-proof plates, wherein a distance between an end portion of the splash-proof plate and the first end portion is smaller than a distance between the first end portion and the start end portion in the axial direction.

3. The vent plug for a lead-acid battery according to claim 1, further comprising a splash-proof body having a plurality of splash-proof plates, wherein a distance between an end portion of the splash-proof plate and the first end portion is smaller than a distance between the end portion of the screw thread portion and the first end portion in the axial direction.

4. The vent plug for a lead-acid battery according to claim 1, wherein when viewed in the plan view from the radially outer side of the cylinder portion, a top portion of the slit is higher than a peak of the first peripheral screw thread portion where the screw thread portion intersects the slit.

5. The vent plug for a lead-acid battery according to claim 1, further comprising a splash-proof body having a plurality of splash-proof plates, wherein when a distance from a bottom portion of the slit to a top portion of the slit in the axial direction is h1, a distance from the second end portion to an end portion of the splash-proof plate in the axial direction is h2, and a pitch of the screw thread portion is $\alpha$, h1, h2, and $\alpha$ satisfy a following relational expression:

$$h_1 < h_2 < h_1 + \alpha.$$

6. A lead-acid battery comprising the vent plug according to claim 1.

* * * * *